US012761337B2

(12) United States Patent
Chang et al.

(10) Patent No.: US 12,761,337 B2
(45) Date of Patent: Oct. 13, 2026

(54) ELECTRONIC DEVICES HAVING ANTENNA ARRAYS FOR PERFORMING PROXIMITY DETECTION OPERATIONS AND DETECTION METHODS THEREOF

(71) Applicant: MEDIATEK Inc., Hsinchu City (TW)

(72) Inventors: Wei-Hsuan Chang, Hsinchu City (TW); Cheng-Han Lee, Hsinchu City (TW); Chih-Wei Lee, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 314 days.

(21) Appl. No.: 18/060,093

(22) Filed: Nov. 30, 2022

(65) Prior Publication Data

US 2024/0176004 A1 May 30, 2024

(51) Int. Cl.
*G01S 13/08* (2006.01)
*G01S 7/03* (2006.01)
*G01S 7/40* (2006.01)

(52) U.S. Cl.
CPC .............. *G01S 13/08* (2013.01); *G01S 7/034* (2013.01); *G01S 7/4013* (2021.05)

(58) Field of Classification Search
CPC ........ G01S 13/08; G01S 7/4013; G01S 7/034; G01S 13/56
See application file for complete search history.

(56) References Cited

U.S. PATENT DOCUMENTS 10,826,177 B2 11/2020 Mow
11,841,455 B1 * 12/2023 Arool Emmanuel ........................ G01S 7/4013
2011/0181458 A1 * 7/2011 Feil ........................ G01S 7/4056 342/124
2014/0070958 A1 * 3/2014 Foo ........................ A61B 5/742 340/870.07
2015/0260835 A1 * 9/2015 Widmer ................ B60L 53/124 342/27
2016/0327634 A1 * 11/2016 Katz .................... H04B 1/3838
2018/0115342 A1 * 4/2018 Doane ...................... H04B 1/44
2019/0267709 A1 * 8/2019 Mow ...................... H01Q 21/24
2019/0379467 A1 * 12/2019 Neumeier .............. H04B 17/30
2020/0169295 A1 * 5/2020 Pierson ................ H04B 17/318
2020/0333447 A1 * 10/2020 Cardei .................... G01S 17/10
2024/0214082 A1 * 6/2024 Huang .................. H04B 17/21

FOREIGN PATENT DOCUMENTS

CN 104215949 A * 12/2014 ............... G01S 7/40

* cited by examiner

*Primary Examiner* — Vladimir Magloire
*Assistant Examiner* — Hailey R Le
(74) *Attorney, Agent, or Firm* — McClure, Qualey & Rodack, LLP

(57) ABSTRACT

An electronic device comprises: a radio frequency (RF) front end circuit for generating wireless signals; an antenna array for transmitting the wireless signals generated by the RF front end circuit and receiving the wireless signals transmitted by the antenna array; and a control unit coupled to the RF front end circuit. In the embodiments, a receiving power or a receiving power difference is estimated based on the wireless signals received by the RF front end circuit; and a distance information between an external object and the electronic device is determined based on the receiving power difference, or whether the external object is within a detection area of the electronic device is determined based on the receiving power.

20 Claims, 9 Drawing Sheets

Transmission coefficient Amplitude/Phase in free space

| | Tx1 to Rx2 | | Tx1 to Rx3 | | Tx1 to Rx4 | | Tx1 to Rx5 | |
|---|---|---|---|---|---|---|---|---|
| Free space | 0.127 | 45° | 0.053 | 21.8° | 0.022 | 26.5° | 0.008 | 82.9° |

→ A

Transmission coefficient Amplitude/Phase with obstacle

| | Tx1 to Rx2 | | Tx1 to Rx3 | | Tx1 to Rx4 | | Tx1 to Rx5 | |
|---|---|---|---|---|---|---|---|---|
| 2mm | 0.31 | 12.72° | 0.086 | -54.46° | 0.07 | -23.2° | 0.026 | -15.64° |

→ B

B (phasor form) -A (phasor form) = reflection coupling from object

FIG. 4B

| S | Rx2 |
|---|---|
| 0 (mm) | -13.10 |
| -5 | -13.81 |
| -10 | -14.32 |
| -15 | -13.07 |
| -20 | -18.04 |
| -25 | -18.04 |
| Free space | -18.04 |

ELECTRONIC DEVICES HAVING ANTENNA ARRAYS FOR PERFORMING PROXIMITY DETECTION OPERATIONS AND DETECTION METHODS THEREOF

TECHNICAL FIELD

The disclosure relates in general to electronic devices having antenna arrays for performing proximity detection operations and detection methods thereof.

BACKGROUND

Electronic devices often include wireless communications circuitry. For example, cellular telephones, computers, and other devices often contain antennas and wireless transceivers for supporting wireless communications.

The wireless communications circuitry may include antenna arrays (for example but not limited by, Antenna-in-Module (AiM)) and transceiver circuitry such as centimeter and millimeter wave transceiver circuitry (e.g., circuitry that transmits and receives radio-frequency signals at frequencies greater than 10 GHZ).

Design of Antenna-in-Module (AiM) is presented to realize active and reconfigurable antenna arrays for potential 5G applications at millimeter-wave (mmW) frequencies. Due to the large array configuration, transmission line loss in the dielectric substrates is significant to cause gain degradation and heat issues.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums. In addition, if care is not taken, external objects in the vicinity of the electronic device may block millimeter wave communications signals in certain directions. Industry or government standards or regulations may also impose limits on the amount of millimeter wave energy that is absorbed by external objects such as the user's body in the vicinity of the electronic device.

It would therefore be desirable to be able to provide electronic devices having antenna arrays for performing proximity detection operations and detection methods thereof.

SUMMARY

According to one embodiment, provided is an electronic device comprising: a radio frequency (RF) front end circuit for generating wireless signals; an antenna array, coupled to the RF front end circuit, for transmitting the wireless signals generated by the RF front end circuit and receiving the wireless signals transmitted by the antenna array; and a control unit coupled to the radio frequency (RF) front end circuit. Wherein a receiving power or a receiving power difference is estimated based on the wireless signals received by the RF front end circuit; and a distance information between an external object and the electronic device is determined based on the receiving power difference, or whether the external object is within a detection area of the electronic device is determined based on the receiving power.

According to another embodiment, provided is a proximity detection method for an electronic device, the proximity detection method comprising: transmitting from an antenna array wireless signals generated by a radio frequency (RF) front end circuit and receiving the wireless signals by the antenna array; estimating a receiving power or a receiving power difference based on the wireless signals received by the RF front end circuit; and determining a distance information between an external object and the electronic device based on the receiving power difference, or determine whether the external object is within a detection area of the electronic device based on the receiving power.

According to an alternative embodiment, provided is an electronic device comprising: a radio frequency (RF) front end circuit for generating wireless signals; an antenna array, coupled to the RF front end circuit, for transmitting the wireless signals generated by the RF front end circuit and receiving the wireless signals transmitted by the antenna array; and a control unit coupled to the radio frequency (RF) front end circuit, wherein the control unit is configured to control a first set of transceiver circuitries of the RF front end circuit to transmit the wireless signals to a third set of the antenna array and control a second set of transceiver circuitries of the RF front end circuit to receive the wireless signals transmitted from the third set of antennas of the antenna array using a fourth set of antennas of the antenna array. Wherein a receiving power or a receiving power difference is gathered based on the wireless signals received by the RF front end circuit; and a distance information between an external object and the electronic device is determined based on the receiving power difference, or whether the external object is within a detection area of the electronic device is determined based on the receiving power.

BRIEF DESCRIPTION OF THE DRAWINGS

FIG. 4B shows the way how to extract the reflection coupling according to one embodiment of the application.

Figure 1:
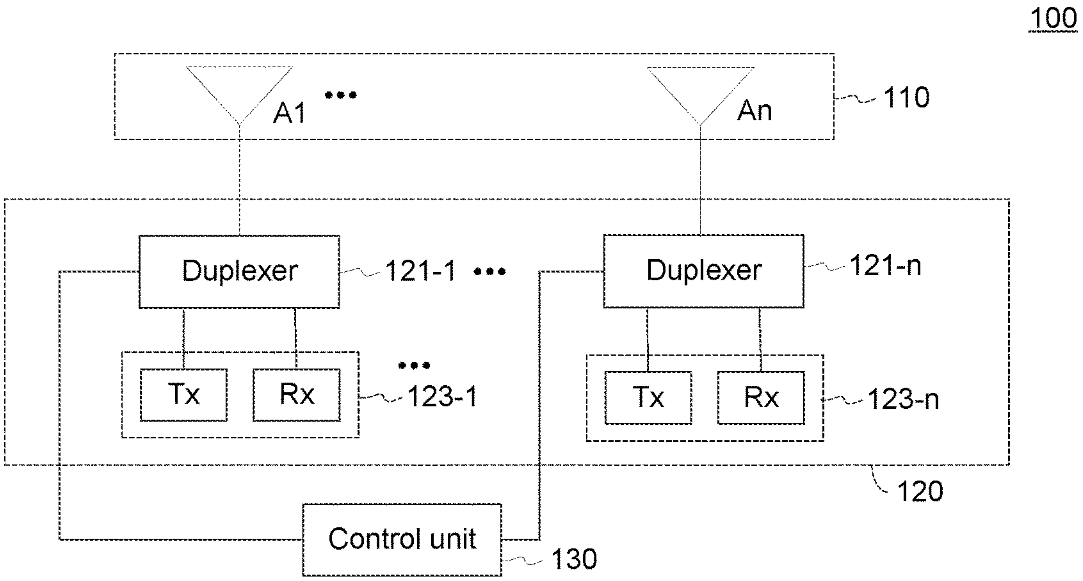
FIG. 1 shows a functional block diagram of an electronic device according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a functional block diagram of an electronic device 100 according to one embodiment of the application. Electronic devices 100 in FIG. 1 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment. The above-mentioned examples are merely illustrative. Other configurations may be used for electronic device if desired.

As shown in FIG. 1, the electronic device 100 according to one embodiment of the application at least includes an antenna array 110, a radio frequency (RF) front end circuit 120 and a control unit 130.

The antenna array 110 is coupled to the RF front end circuit 120. The antenna array 110 is for example but not limited by, Antenna-in-Module (AiM). The antenna array 110 includes a plurality of antennas A1~An (n being a positive integer). The antennas A1~An may are used for handling for example but not limited by, millimeter wave and centimeter wave communications. Millimeter wave communications, which are sometimes referred to as extremely high frequency (EHF) communications, involve signals at 60 GHz or other frequencies between about 30 GHZ and 300 GHz. Centimeter wave communications involve signals at frequencies between about 10 GHz and 30 GHz. If desired, the electronic device 100 may also contain wireless communications circuitry for handling satellite navigation system signals, cellular telephone signals, local wireless area network signals, near-field communications, light-based wireless communications, or other wireless communications.

The antenna array 110 is for transmitting the wireless signals generated by the RF front end circuit 120 and receiving the wireless signals transmitted by the antenna array 110.

Figure 2:
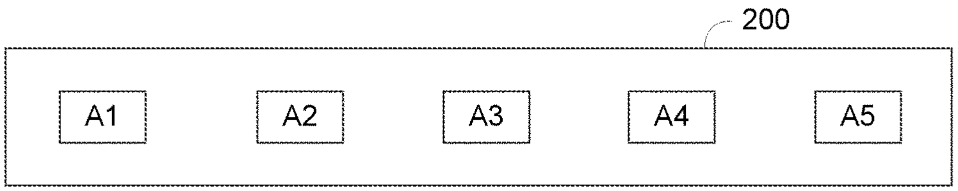
FIG. 2 shows a diagram of the millimeter-wave (mmW) antenna module which may implement the antenna array according to one embodiment of the application.

FIG. 2 shows a diagram of the millimeter-wave (mmW) antenna module 200 which may implement the antenna array 110 according to one embodiment of the application. Here, the mmW antenna module 200 includes five antennas A1~A5, but the application is not limited by this.

Of course, the antenna array 110 according to one embodiment of the application is not limited by the mmW antenna modules shown in FIG. 2. Other possible antenna modules may be suitable for implementing the antenna array 110 according to one embodiment of the application, which is still within the spirit and the scope of the application.

The RF front end circuit 120 is coupled to the antenna array 110 and the control unit 130. The RF front end circuit 120 includes a plurality of duplexers **121-1~121-*n* and a plurality of transceiver circuitry 123-1~123-*n*. Each of the transceiver circuitry 123-1~123-*n* includes a transmitter circuit Tx and a receiver circuit Rx. The transceiver circuitry 123-1~123-*n*** is for generating wireless signals at a frequency suitable for millimeter wave and centimeter wave communications.

The control unit 130 is for controlling the transmitting-receiving configuration TRx of the RF front end circuit 120 based on a system requirement, for example but not limited by, based on a system Signal-to-noise ratio (SNR) requirement. The transmitting-receiving configuration TRx of the RF front end circuit 120 refers to the configuration of each of the transceiver circuitry **123-1~123-*n*. For example but not limited by, one possible transmitting-receiving configuration TRx of the RF front end circuit 120 refers to that the transmitter circuit Tx of the transceiver circuitry 123-1 and the receiver circuit Rx of the transceiver circuitry 123-2~123-*n* are selected; and under this transmitting-receiving configuration, the antenna A1 is for transmitting wireless signals and the antennas A2**~An are for receiving wireless signals.

The plurality of antennas A1~An are coupled to the plurality of transceiver circuitry **123-1~123-*n* via the plurality of duplexers 121-1~121-*n*, respectively. For example, the antenna A1 is coupled to the transceiver circuitry 123-1 via the duplexer 121-1. The wireless signals generated by the transceiver circuitry 123-1~123-*n* are sent to the antennas A1~An via the plurality of duplexers 121-1~121-*n*; and the wireless signals received by the antennas A1~An are sent to the transceiver circuitry 123-1~123-*n* via the plurality of duplexers 121-1~121-*n***.

Thus, based on the transmitting-receiving configuration of the RF front end circuit 120 determined by the control unit 130, a first set of the transceiver circuitry **123-1~123-*n* are selected for generating the wireless signals to the antenna array 110 and a second set of the transceiver circuitry 123-1~123-*n* are selected for receiving the wireless signals received by the antenna array 110. Also, based on the transmitting-receiving configuration of the RF front end circuit 120 determined by the control unit 130, a third set of the antennas of the antenna array 110 are for transmitting the wireless signals generated by the first set of the transceiver circuitry and a fourth set of the antennas of the antenna array 110 are for receiving the wireless signals transmitted from the third set of the antennas of the antenna array 110**.

When an external object (for example a user human body) approximates the electronic device 100, the wireless signals from the transmitter circuits Tx of the transceiver circuitry 123-1~123-*n* are transmitted via the antennas A1~An toward the external object; and the wireless reflected from the external object are received via the antennas A1~An by the receiving circuits Rx of the transceiver circuitry 123-1~123-*n*. Based on the wireless signals received by the receiving circuits Rx of the transceiver circuitry 123-1~123-*n*, the distance information between the electronic device 100 and the external object may be determined; and if desired, the transmitting power of the transmitter circuits Tx of the transceiver circuitry 123-1~123-*n* may be adjusted. Alternatively, based on the wireless signals received by the receiving circuits Rx of the transceiver circuitry 123-1~123-*n*, whether the external object is within a detecting area of the electronic device 100 may be determined.

In the following, at least two embodiments of the application are described. In the first embodiment of the application, based on the wireless signals received by the receiving circuits Rx of the transceiver circuitry 123-1~123-*n*, the distance information between the electronic device 100 and the external object may be determined; and if desired, the transmitting power of the transmitter circuits Tx of the transceiver circuitry 123-1~123-*n* may be adjusted. In the second embodiment of the application, based on the wireless signals received by the receiving circuits Rx of the transceiver circuitry 123-1~123-*n*, whether the external object is within a detecting area of the electronic device 100 may be determined.

First Embodiment

In the first embodiment of the application, based on the wireless signals received by the receiving circuits Rx of the transceiver circuitry 123-1~123-*n*, the distance information between the electronic device 100 and the external object may be determined; and if desired, the transmitting power of the transmitter circuits Tx of the transceiver circuitry 123-1~123-*n* may be adjusted.

Figure 3A:
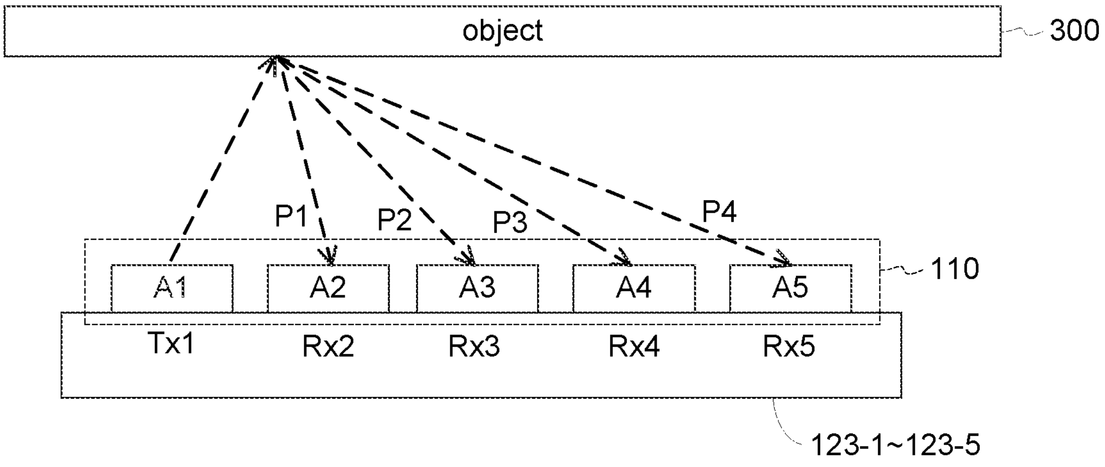
FIG. 3A and FIG. 3B show two cases of the first embodiment of the application.
Figure 3B:
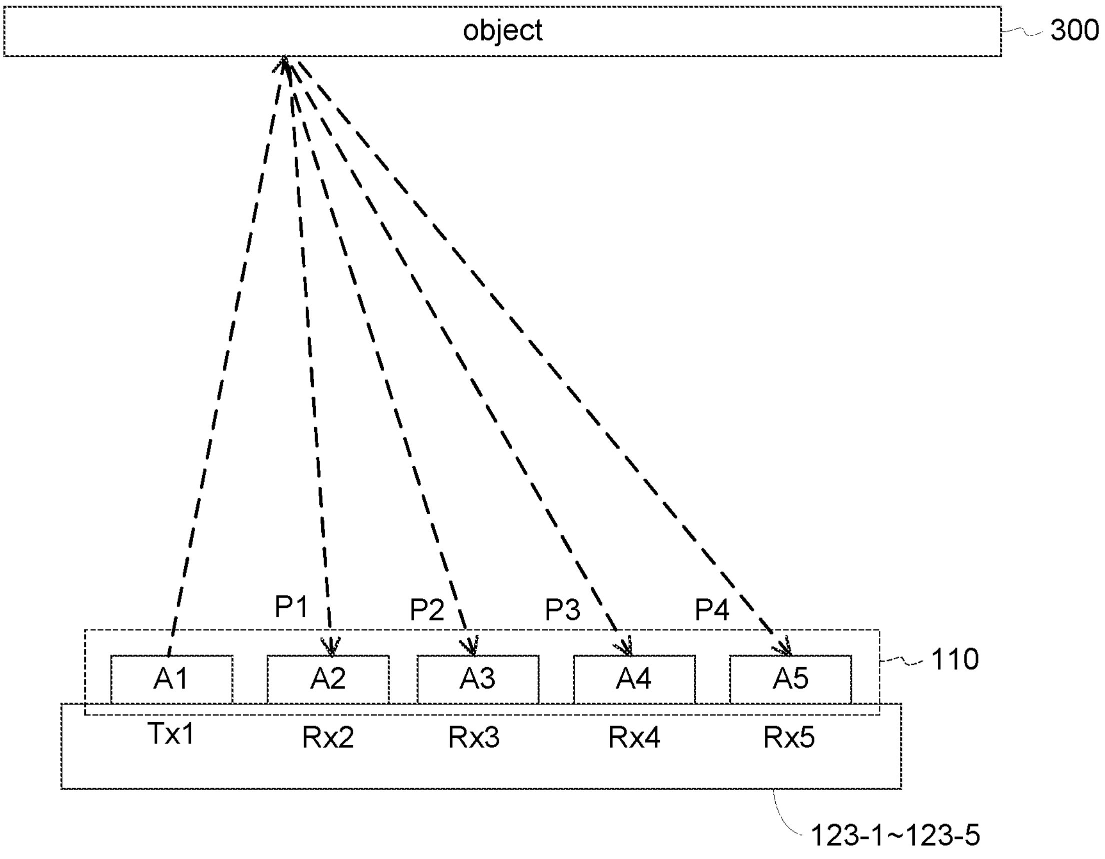

FIG. 3A and FIG. 3B show two cases of the first embodiment of the application. The external object 300 in FIG. 3A is closer to the electronic device 100 than FIG. 3B.

As shown in FIG. 3A and FIG. 3B, it is assumed that the transmitting-receiving configuration TRx of the RF front end circuit 120 is set as 1T4R by the control unit 130, wherein in this case, that the transmitter circuit Tx of the transceiver circuitry 123-1 and the receiver circuit Rx of the transceiver circuitry 123-2~123-5 are selected; and further, the antenna A1 is for transmitting wireless signals and the antennas A2~A5 are for receiving wireless signals.

The wireless signals transmitted from the antenna A1 is reflected by the external object 300 and received by the antennas A2~A5. Wherein the reflection paths P1~P4 indicate the path from the external object 300 to the antennas A2~A5, respectively.

The first embodiment of the application introduces first calibration and second calibration. In the first calibration, the reflection coupling is extracted and the coupling between Tx and Rx antenna elements are calibrated. In the second calibration, the radar cross section (RCS) power loss and the RF front end gain will be calibrated.

When the external object 300 is closer, the path length difference between the reflection paths P1~P4 is larger; and when the external object 300 is more far, the path length difference between the reflection paths P1~P4 is smaller. That is, the path length difference between the reflection paths is corresponding to the distance information between the external object 300 and the electronic device 100. Further, the path length difference between the reflection paths is also corresponding to the receiving power difference. However, using receiving power difference for one more reason is that this way can extract the power loss cause from path difference purely, and the RCS effect and the RF frond end gain will be calibrated.

Thus, in the first embodiment of the application, after the first calibration which removes the coupling between the Tx and Rx antenna elements and in the second calibration, the receiving power difference between the wireless signals received by the receiver circuit Rx of the transceiver circuitry 123-2~123-5 are got, the receiving power difference is used to determine the distance information between the external object 300 and the electronic device 100.

Details of the first calibration about extracting the reflection coupling are described.

Figure 4A:
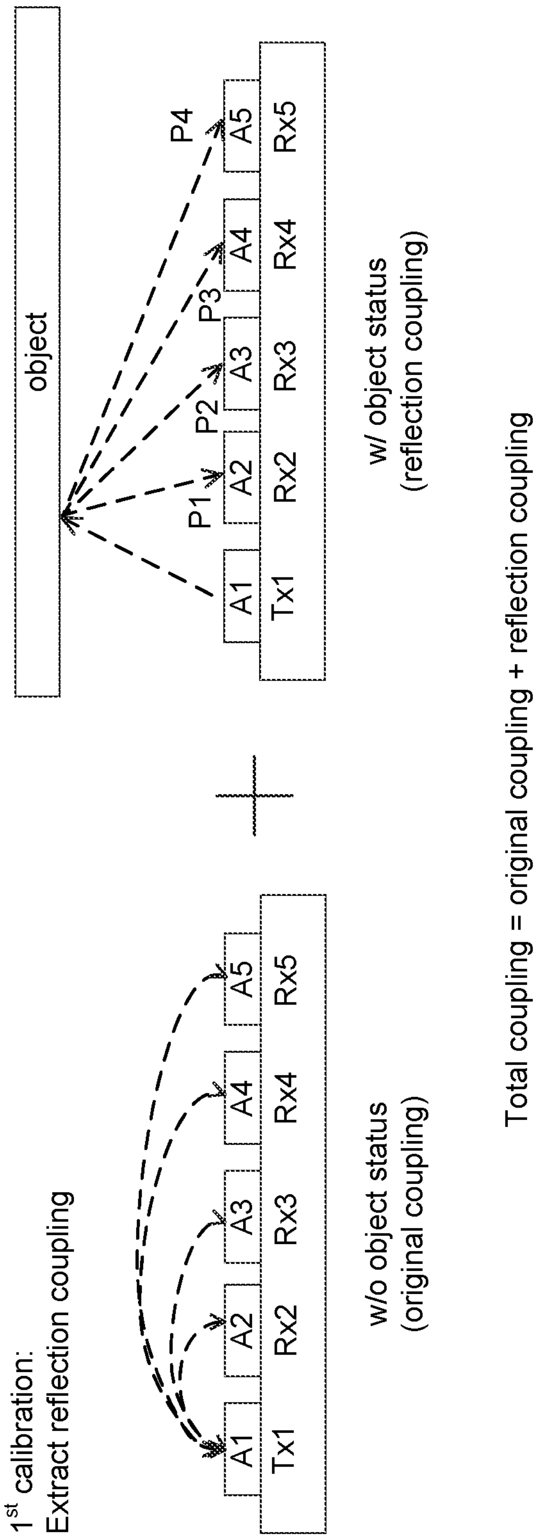
FIG. 4A shows that the total coupling is combined with an original coupling between transmission (Tx) and receiving (Rx) antenna elements without external object (i.e. when the external object is not in proximity) and a reflection coupling cause from external object (i.e. when the external object is in proximity) according to one embodiment of the application.

FIG. 4A shows that the total coupling is combined with an original coupling between Tx and Rx antenna elements without external object (i.e. when the external object is not in proximity) and a reflection coupling cause from external object (i.e. when the external object is in proximity) according to one embodiment of the application. FIG. 4B shows the way how to extract the reflection coupling according to one embodiment of the application.

As shown in FIG. 4A, in the original coupling between Tx and Rx antenna elements without external object, the wireless signals transmitted from the antenna A1 is directly received by the antennas A2~A5; and in the reflection coupling with external object, the wireless signals transmitted from the antenna A1 is reflected by the external object and received by the antennas A2-A5.

As shown in FIG. 4B, the term "A" refers to the transmission coefficient amplitude and phase in free space (i.e. without any external object). For example, in free space, the wireless signal marked as "Tx1 to Rx2 (the wireless signals transmitted from the antenna A1 and directly received by the antenna A2)" has the transmission coefficient amplitude and phase as 0.127 and 45°. Others are similar.

As shown in FIG. 4B, the term "B" refers to the transmission coefficient amplitude and phase in the total coupling (i.e. combined with original coupling and reflection coupling). For example, it is assumed that the external object is 2 mm distance from the electronic device 100. In the total coupling, the wireless signal marked as "Tx1 to Rx2 (the wireless signals transmitted from the antenna A1 and received by the antenna A2)" has the transmission coefficient amplitude and phase as 0.31 and 12.72°. Others are similar.

In order to extract the reflection coupling, the term B (in phasor form) is minus by the term A (in phasor form) to calculate the reflection coupling from the external object. The reflection coupling is extracted by eliminating the original reflection.

Details of the second calibration about calibrating the radar cross section (RCS) power loss and the RF front end gain are described.

Figure 5:
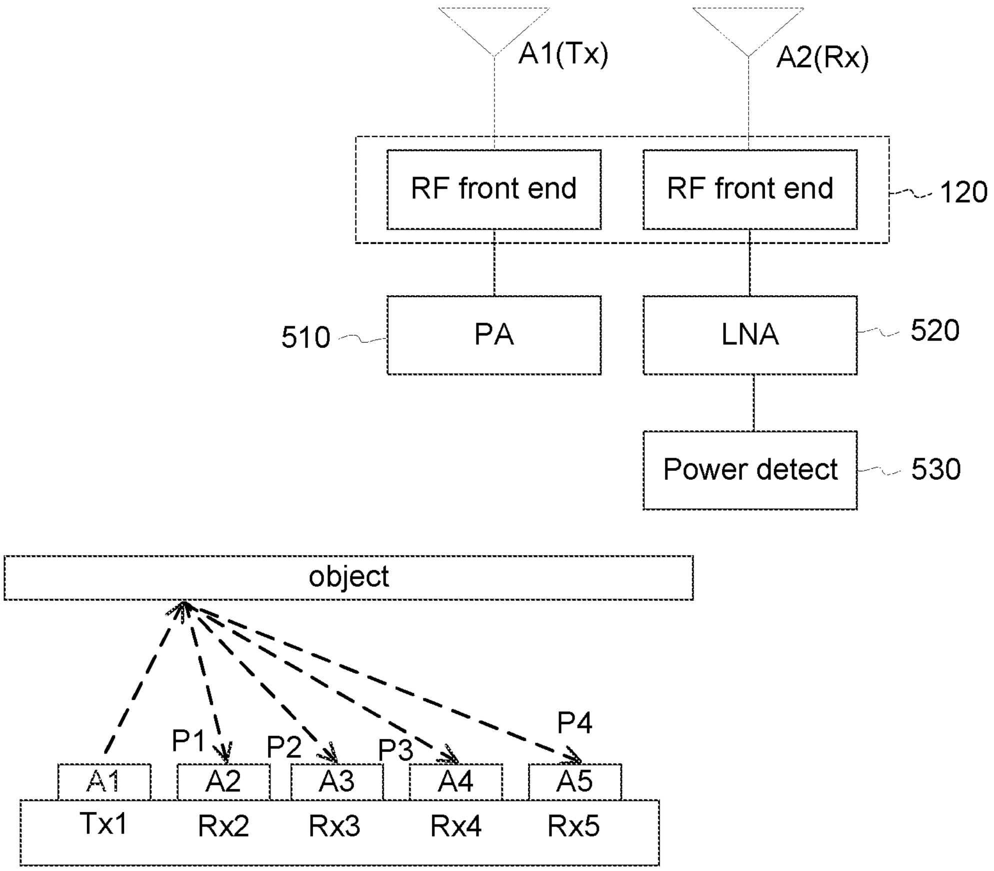
FIG. 5 shows the link budget evaluation when the external object is in proximity.

FIG. 5 shows the architecture of link budget evaluation when the external object is in proximity. In FIG. 5, the link budget estimation can be assumed that the power amplifier (PA) 510 has power gain of "X" dB; the RF front end circuit has loss of "Y" dB; and the low noise amplifier (LNA) 520 has gain of "Z" dB. The reflection coupling (RC) includes air loss, radar cross section (RCS) loss and antenna gain. Thus, the link budget detected by the power detector 530 is expressed as:

$Tx1$ to $Rx2$ link budget: $X+2Y+Z+RC1$ (1)

$Tx1$ to $Rx3$ link budget: $X+2Y+Z+RC2$ (1)

The link budget refers to the gain on the transmission path and the reflection path. In the equations (1) and (2), RC1 refers to the reflection coupling of Tx1 and Rx2; and RC2 refers to the reflection coupling of Tx1 and Rx3. RC1 and RC2 have the same radar cross section (RCS) loss and antenna gain but different air loss. The radar cross section (RCS) refers to the loss when reflected by the external object and thus RCS is corresponding to the surface material of the external object. Therefore, RC1 and RC2 have the same RCS loss. Also, it is assumed that the antennas A1~An have the same antenna gain.

Thus, subtracting equation (2) from equation (1), it is obtained that (1)-(2)=air loss (RC1)-air loss (RC2). That is, the link budget difference is corresponding to the reflection path.

Therefore, the power loss in real case of FIG. 5 is summarized in the table 1, wherein D refers to the distance information between the external object and the electronic device 100:

TABLE 1

| After first calibration | D = 2(mm) |
|---|---|
| Rx2 (S21) | −13.12 |
| Rx3 (S31) | −26.02 |
| Rx4 (S41) | −23.87 |
| Rx5 (S51) | −30.97 |
| Average of the receiving power difference (S21-S31, S21-S41, S21-S51) | −13.34 |
| scaling | Scaling to measurement |

In the above table, S21 refers to the wireless signal power transmitted by the antenna A1 and received by the antenna A2 and others are so on. In order to calculate the second calibration, all the wireless receiving power difference (i.e. the terms (S21-S31, S21-S41, S21-S51)) are averaged for enhancing distance determination stability and accuracy.

By simulating difference distance information between the external object and the electronic device, a simulation result is summarized in the following table 2. The simulation result is obtained after the first calibration is performed.

TABLE 2

| D (mm) | Rx2 (S21) (db) | Rx3 (S31) (db) | Rx4 (S41) (db) | Rx5 (S51) (db) | Average of the receiving power difference (S21 − S31, S21 − S41, S21 − S51) | scaling |
|---|---|---|---|---|---|---|
| 2 | −13.12 | −26.02 | −23.87 | −30.97 | −13.34 | Scaling to measurement result −13.34 dB to XdB |
| 4 | −13.10 | −18.04 | −26.99 | −36.99 | −13.67 | XdB −0.33 dB |
| 6 | −16.02 | −20.00 | −26.02 | −30.97 | −16.86 | XdB −3.52 dB |
| 8 | −17.62 | −20.13 | −21.67 | −28.24 | −19.47 | XdB −6.13 dB |
| 10 | −17.45 | −20.71 | −21.37 | −22.68 | −19.63 | XdB −6.29 dB |
| 12 | −21.31 | −23.01 | −24.95 | −25.23 | −24.32 | XdB −10.98 dB |
| 14 | −22.76 | −22.84 | −23.01 | −27.70 | −28.86 | XdB −15.52 dB |

In table 2, "Scaling to measurement" refer to establish a mapping table between the simulation data and the measurement data. For example, under D=2 mm, a reference measurement data "−16.34 dB" is measured wherein the simulation data is "−13.34 dB". The reference measurement data is stored in the electronic device 100. In the following, another measurement data "−19.34 dB" is measured. This measurement data "−19.34 dB" is compared with the reference measurement data "−16.34 dB" to obtain a difference measurement data "−3 dB". Thus, the difference measurement data "−3 dB" is compared with the difference simulation data to estimate the distance information. For example, when D=6, the simulation data is −16.86 dB while the simulation data (D=2) is "−13.34 dB" and the difference simulation data is −16.86−(−13.34)=−3.52 (dB). When D=4, the simulation data is −13.67 dB while the simulation data (D=2) is "−13.34 dB" and the difference simulation data is −13.67−(−13.34)=−0.33 (dB). The difference measurement data "−3 dB" is close to the difference simulation data −3.52 (dB) (D=6). Thus, it is determined that the distance information D=6 when the measurement data "−19.34 dB" is measured.

Figure 6:
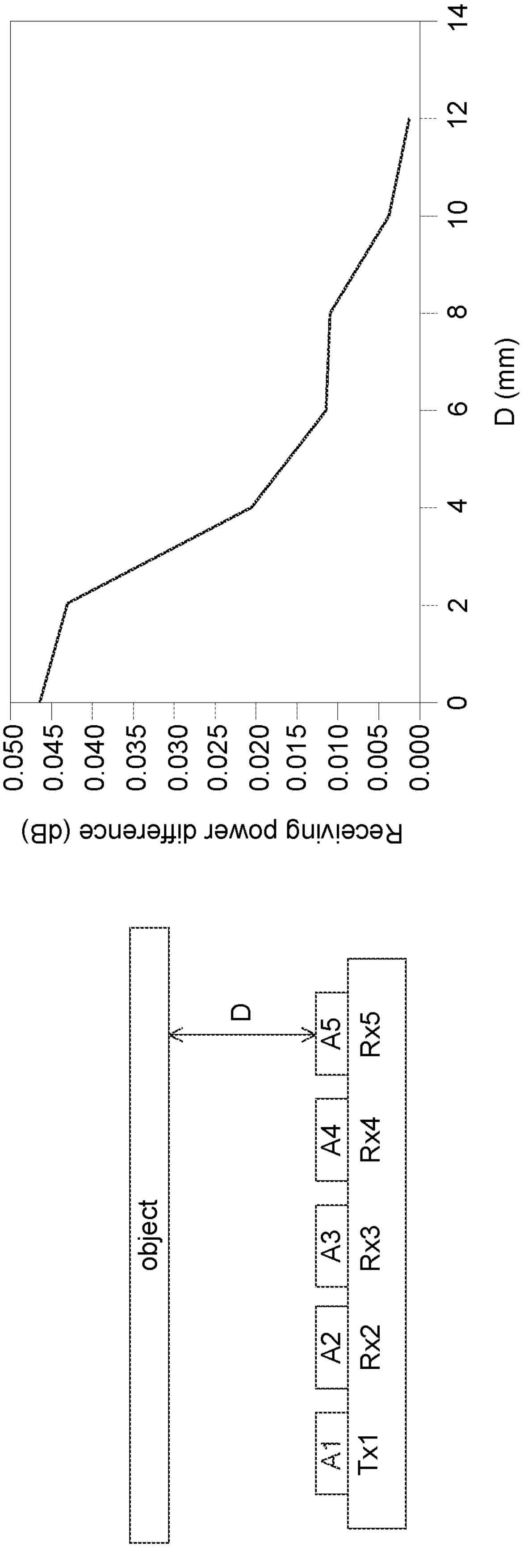
FIG. 6 shows a simulation result of the distance information (D) and the receiving power difference according to one embodiment of the application.

FIG. 6 shows a simulation result of the distance information (D) and the receiving power difference (or the average of the receiving power difference) according to one embodiment of the application. Taken as an example, FIG. 6 is based on the above table 2, which is not to limit the application. According to one embodiment of the application, the distance information (D) and the averaged receiving power difference are in negative correlation, as shown in FIG. 6.

Thus, in the first embodiment of the application, based on the first calibration, the second calibration gets the receiving power difference between the wireless signals received by the receiver circuit Rx of the transceiver circuitry which are used to determine the distance information between the external object 300 and the electronic device 100. Because the RCS loss, which is related to the surface material of the external object, is also calibrated, the determined distance information is basically not related to the surface material of the external object.

Figure 7:
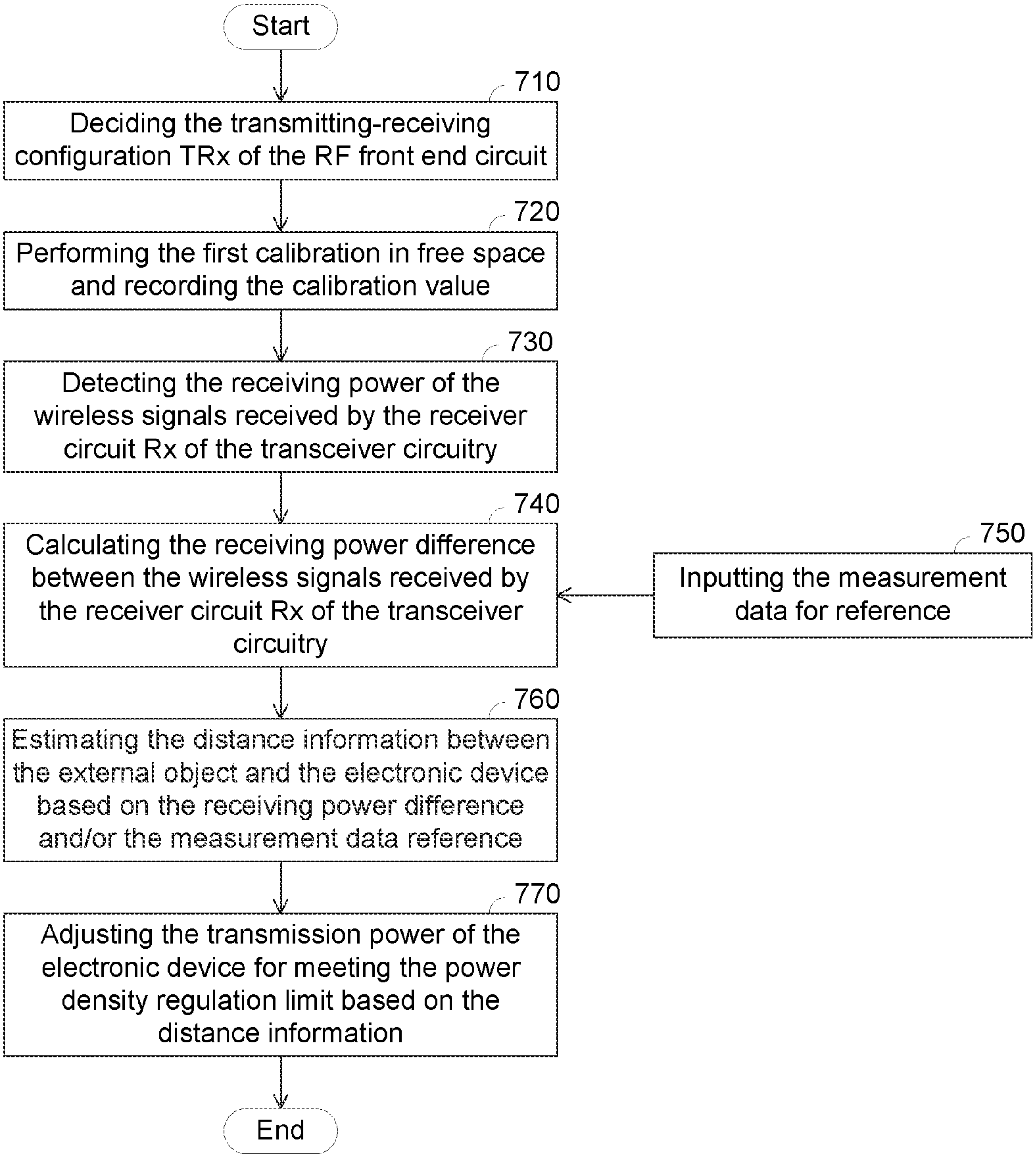
FIG. 7 shows a flow chart of the proximity detection method of an electronic device according to one embodiment of the application.

FIG. 7 shows a flow chart of the proximity detection method of an electronic device according to one embodiment of the application. As shown in FIG. 7, in step 710, the transmitting-receiving configuration TRx of the RF front end circuit is decided by the control unit. In step 720, the first calibration in free space is performed and the calibration value is recorded. In step 730, the receiving power of the wireless signals received by the receiver circuit Rx of the transceiver circuitry are detected. In step 740, the receiving power difference between the wireless signals received by the receiver circuit Rx of the transceiver circuitry are calculated. Also, in step 750, the measurement data (for example but not limited, data in table 2) are input for reference. In step 760, the distance information between the external object and the electronic device is estimated or generated based on the receiving power difference and/or the measurement data reference. In step 770, if desired, the transmission power of the electronic device is refined or adjusted for meeting the power density regulation limit based on the distance information.

In the first embodiment of the application, in setting the transmitting-receiving configuration TRx of the RF front end circuit by the control unit, in order to improve the receiving SNR (signal-noise ratio), the control unit selects more transmitter circuits Tx of the transceiver circuitry and more transmission antennas.

In the first embodiment of the application, in setting the transmitting-receiving configuration TRx of the RF front end circuit by the control unit, in order to improve the stability in determining the distance information, the control unit selects more receiver circuits of the transceiver circuitry and more receiving antennas.

Second Embodiment

In the second embodiment of the application, based on the wireless signals receiving power received by the receiving circuits Rx of the transceiver circuitry 123-1~123-*n*, whether the external object is within a detecting area of the electronic device 100 may be determined.

Figure 8:
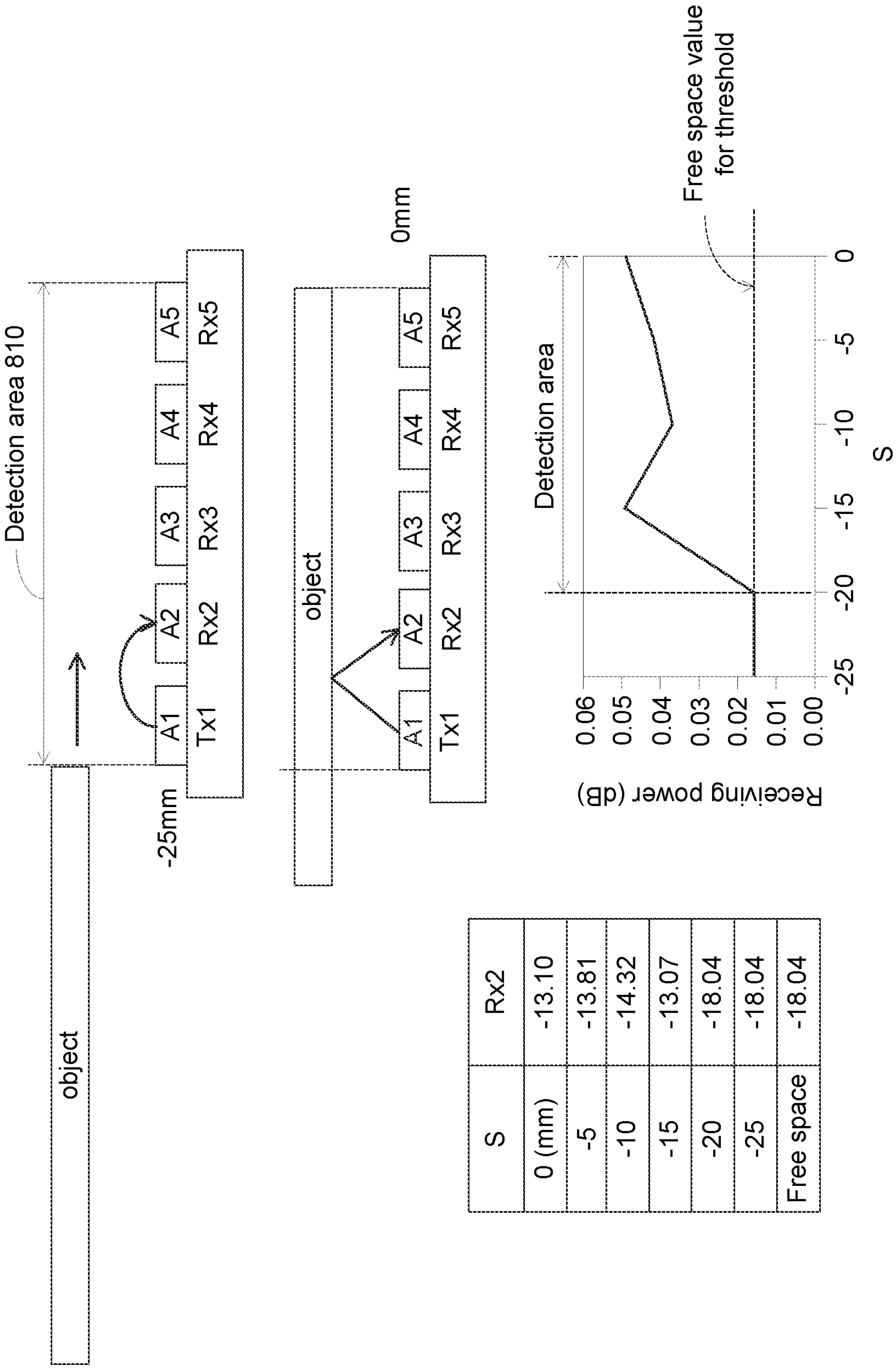
FIG. 8 shows proximity detection of an electronic device having antenna arrays according to the second embodiment of the application.

FIG. 8 shows proximity detection of an electronic device having antenna arrays according to the second embodiment of the application. In order to perform the proximity detection according to the second embodiment of the application, the control unit 130 controls the transmitting-receiving configuration TRx of the RF front end circuit 120 as 2T3R, wherein the transmitter circuits Tx of the transceiver circuitry 123-1 and 123-5 are selected; and the receiver circuits Rx of the transceiver circuitry 123-2~123-4 are selected. That is, under this transmitting-receiving configuration (2T3R), the antennas A1 and A5 are for transmitting wireless signals and the antennas A2~A4 are for receiving wireless signals.

In performing the proximity detection method of the second embodiment, the antennas on the two sides of the antenna array 110 are involved. When the external object is moving into the detection area 810 from left to right, the antennas A1 and A2 on the left side of the antenna array 110 are used in transmitting and receiving, respectively; and when the external object is moving into the detection area 810 from right to left, the antennas A5 and A4 on the right side of the antenna array 110 are used in transmitting and receiving, respectively. In detecting whether the external object is moving into the detection area 810 from a first side toward a second side, the outmost antenna on the first side of the antenna array 110 is used as a transmission antenna; and the second outmost antenna on the first side of the antenna array 110 is used as a receiving antenna.

Also, the original coupling in the case that the external object is out of the detection area 810 (i.e. free space) should be calibrated. Calibration of the original coupling under free space may be the same or similar with the first embodiment. Thus, the original coupling under free space is taken as a reference or a threshold value.

As shown in FIG. 8, when the external object is moving into the detection area 810 from left to right, the wireless signals transmitted from the antenna A1 are reflected by the external object and received by the antenna A2. When the receiving power is higher than the (free space) threshold value, it is determined that the external object is within the detection area 810.

In FIG. 8, the parameter "S" refers to the depth that the external object moves into the detection area 810. For example but not limited by, when S=−25~−20, the receiving power is the same as the (free space) threshold value (−18.04), it is determined that the external object is out of the detection area 810. However, when S≥−20, the receiving power (−13.07) is higher than the (free space) threshold value, it is determined that the external object is in the detection area 810.

By so, in the second embodiment of the application, based on whether the receiving power is higher than the (free space) threshold value or not, it is determined that the external object is in the detection area 810 or out of the detection area 810. Also, when it is determined that the external object is in the detection area 810, the transmission power of the electronic device 100 is refined or adjusted for meeting the power density regulation limit.

Figure 9:
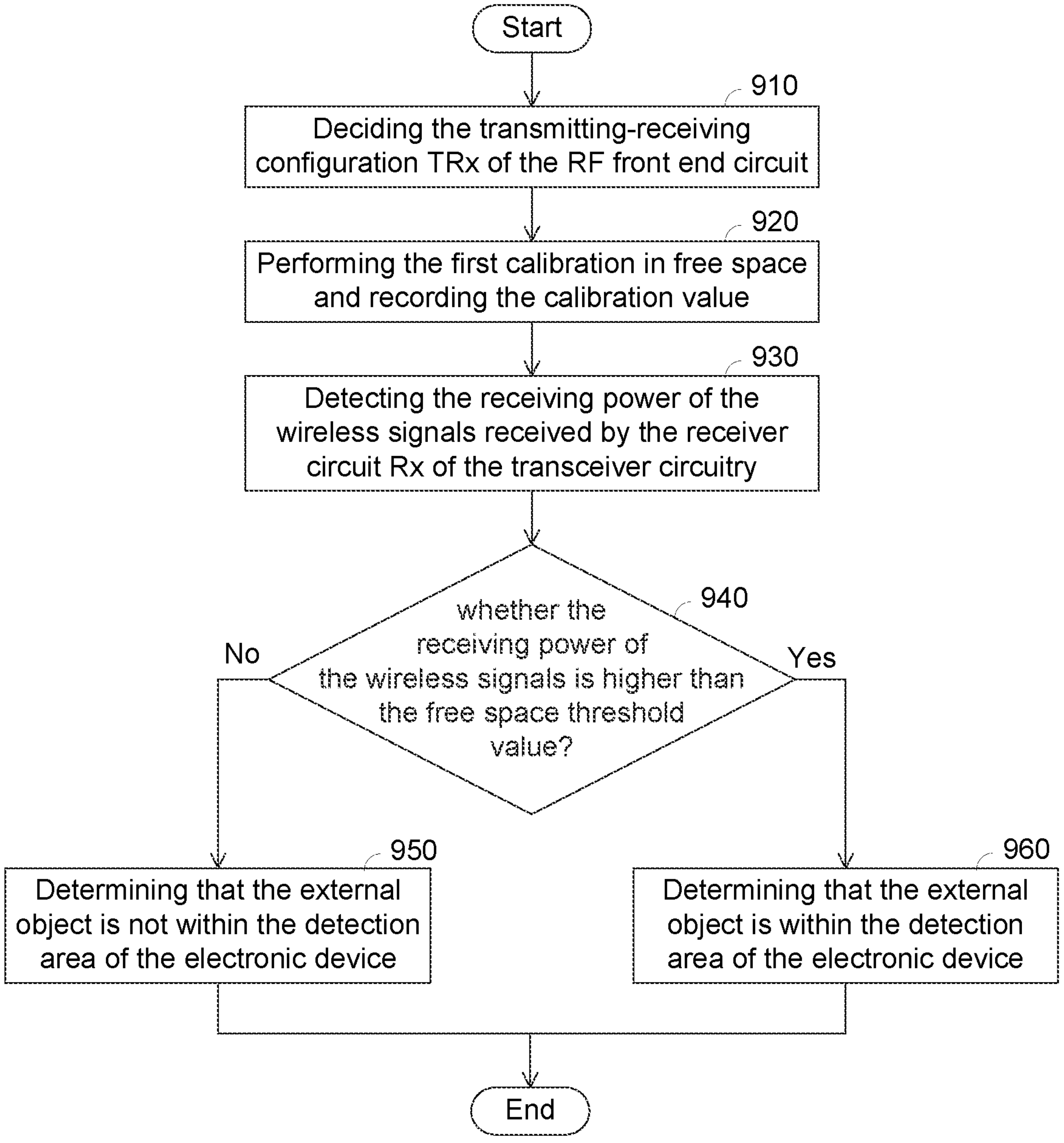
FIG. 9 shows a flow chart of the proximity detection method of an electronic device according to one embodiment of the application.

FIG. 9 shows a flow chart of the proximity detection method of an electronic device according to one embodiment of the application. FIG. 9 is for detecting whether an external object is within a detection area of the electronic device. As shown in FIG. 9, in step 910, the transmitting-receiving configuration TRx of the RF front end circuit is decided by the control unit. In step 920, the first calibration in free space is performed and the calibration value is recorded. In step 930, the receiving power of the wireless signals received by the receiver circuit Rx of the transceiver circuitry are detected. In step 940, whether the receiving power of the wireless signals is higher than the free space threshold value is determined. If the receiving power of the wireless signals is not higher than the free space threshold value, in step 950, it is determined that the external object is not within the detection area of the electronic device. If the receiving power of the wireless signals is higher than the free space threshold value, in step 960, it is determined that the external object is within the detection area of the electronic device. When it is determined that the external object is within the detection area of the electronic device, if desired, the transmission power of the electronic device is refined or adjusted for meeting the power density regulation limit based on the distance information.

Another embodiment of the application discloses an electronic device comprising: a radio frequency (RF) front end circuit for generating wireless signals at a frequency suitable for millimeter wave and centimeter wave communications; an antenna array, coupled to the RF front end circuit, for transmitting the wireless signals generated by the RF front end circuit and receiving the wireless signals transmitted by the antenna array; and a control unit coupled to the radio frequency (RF) front end circuit, wherein the control unit is configured to control a first set of the RF front end circuit to transmit the wireless signals to a third set of the antenna array based on a transmitting-receiving configuration of the RF front end circuit, the transmitting-receiving configuration of the RF front end circuit being based on a system requirement and control a second set of the RF front end circuit to receive the wireless signals transmitted from the third set of the antenna array using a fourth set of the antenna array based on the transmitting-receiving configuration of the RF front end circuit. Wherein a receiving power or a receiving power difference is gathered based on the wireless signals received by the RF front end circuit; and a distance information between an external object and the electronic device is determined based on the receiving power difference, or whether the external object is within a detection area of the electronic device is determined based on the receiving power.

In the application, the first embodiment and the second embodiment may be independently or combined implemented. That is, the electronic device 100 of the application may determine the distance information between the external object and the electronic device and/or determine whether the external object is within the detection area of the electronic device based on the receiving power or the receiving power difference.

The above embodiments of the application support wireless communications in millimeter wave and centimeter wave communications bands. In the above embodiments of the application, by performing proximity detection operations, if desired, the transmission power of the electronic device is refined or adjusted for meeting the power density regulation limit based on the distance information when the external object is detected to be close to the electronic device or the external object is detected to be within the detection area of the electronic device.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device comprising:

a radio frequency (RF) front end circuit for generating wireless signals;

an antenna array, coupled to the RF front end circuit, for transmitting the wireless signals generated by the RF front end circuit and receiving the wireless signals transmitted by the antenna array; and a control unit coupled to the radio frequency (RF) front end circuit, wherein receiving powers of the wireless signals reflected from the external object and received by a plurality of antennas of the antenna array are obtained, a receiving power difference between the receiving powers associated with different antennas of the antenna array is calculated, and a distance information between the external object and the electronic device is determined based on the receiving power difference.

2. The electronic device according to claim 1, wherein a first set of transceiver circuitries of the RF front end circuit is used for generating the wireless signals to the antenna array and a second set of transceiver circuitries of the RF front end circuit is used for receiving the wireless signals received by the antenna array; and a third set of antennas of the antenna array is used for transmitting the wireless signals generated by the first set of the transceiver circuitry and a fourth set of antennas of the antenna array is used for receiving the wireless signals transmitted from the third set of the antennas of the antenna array.

3. The electronic device according to claim 1, wherein in determining the distance information between the external object and the electronic device, in a first calibration, a reflection coupling is extracted; and in a second calibration, a radar cross section (RCS) power loss and an RF front end gain are calibrated;

wherein after the first calibration and the second calibration, the receiving power difference are averaged.

4. The electronic device according to claim 3, wherein in the first calibration, an original coupling without the external object is estimated, a total coupling with the external object is estimated; and the reflection coupling is estimated based on the original coupling and the total coupling.

5. The electronic device according to claim 4, in the second calibration, based on a power gain, a RF front end circuit loss and a low noise amplifier gain, the radar cross section (RCS) power loss and the RF front end gain are calibrated.

6. The electronic device according to claim 5, wherein the distance information between the external object and the electronic device is in negative correlation with an average of the receiving power difference;

the distance information between the external object and the electronic device is determined based on the average of the receiving power difference; and transmission power of the electronic device is refined or adjusted based on the distance information between the external object and the electronic device.

7. The electronic device according to claim 6, wherein in detecting whether the external object is within a detection area, an outmost antenna on a first side of the antenna array is used as a transmission antenna; and a second outmost antenna on the first side of the antenna array is used as a receiving antenna.

8. The electronic device according to claim 7, wherein when the receiving power is higher than a free space threshold value, the external object is determined to be within the detection area of the electronic device; and transmission power of the electronic device is refined or adjusted.

9. A proximity detection method for an electronic device, the proximity detection method comprising:

transmitting, from an antenna array, wireless signals generated by a radio frequency (RF) front end circuit and receiving the wireless signals by the antenna array;

obtaining receiving powers of the wireless signals reflected from the external object and received by a plurality of antennas of the antenna array;

calculating a receiving power difference between the receiving powers associated with different antennas of the antenna array, and a distance information between the external object and the electronic device is determined based on the receiving power difference.

10. The proximity detection method for the electronic device according to claim 9, wherein a first set of transceiver circuitries of the RF front end circuit is used for generating the wireless signals to the antenna array and a second set of transceiver circuitries of the RF front end circuit is used for receiving the wireless signals received by the antenna array; and a third set of antennas of the antenna array is used for transmitting the wireless signals generated by the first set of the transceiver circuitry and a fourth set of antennas of the antenna array is used for receiving the wireless signals transmitted from the third set of the antennas of the antenna array.

11. The proximity detection method for the electronic device according to claim 9, wherein in determining the distance information between the external object and the electronic device, in a first calibration, a reflection coupling is extracted; and in a second calibration, a radar cross section (RCS) power loss and an RF front end gain are calibrated;

wherein after the first calibration and the second calibration, the receiving power difference are averaged.

12. The proximity detection method for the electronic device according to claim 11, wherein in the first calibration, an original coupling without the external object is estimated, a total coupling with the external object is estimated; and the reflection coupling is estimated based on the original coupling and the total coupling.

13. The proximity detection method for the electronic device according to claim 12, in the second calibration, based on a power gain, a RF front end circuit loss and a low noise amplifier gain, the radar cross section (RCS) power loss and the RF front end gain are calibrated.

14. The proximity detection method for the electronic device according to claim 13, wherein the distance information between the external object and the electronic device is in negative correlation with the average of the receiving power difference;

the distance information between the external object and the electronic device is determined based on the average of the receiving power difference; and transmission power of the electronic device is refined or adjusted based on the distance information between the external object and the electronic device.

15. The proximity detection method for the electronic device according to claim 14, wherein in detecting whether the external object is within a detection area, an outmost antenna on a first side of the antenna array is used as a transmission antenna; and a second outmost antenna on the first side of the antenna array is used as a receiving antenna.

16. The proximity detection method for the electronic device according to claim 15, wherein when the receiving power is higher than a free space threshold value, the external object is determined to be within the detection area of the electronic device; and transmission power of the electronic device is refined or adjusted.

17. An electronic device comprising:

a radio frequency (RF) front end circuit for generating wireless signals;

an antenna array, coupled to the RF front end circuit, for transmitting the wireless signals generated by the RF front end circuit and receiving the wireless signals transmitted by the antenna array; and a control unit coupled to the radio frequency (RF) front end circuit, wherein the control unit is configured to control a first set of transceiver circuitries of the RF front end circuit to transmit the wireless signals to a third set of the antenna array and control a second set of transceiver circuitries of the RF front end circuit to receive the wireless signals transmitted from the third set of antennas of the antenna array using a fourth set of antennas of the antenna array;

wherein receiving powers of the wireless signals reflected from the external object and received by a plurality of antennas of the antenna array are obtained, a receiving power difference between the receiving powers associated with different antennas of the antenna array is calculated, and a distance information between the external object and the electronic device is determined based on the receiving power difference.

18. The electronic device according to claim 17, wherein in determining the distance information between the external object and the electronic device, in a first calibration, a reflection coupling is extracted; and in a second calibration, a radar cross section (RCS) power loss and an RF front end gain are calibrated;

in the first calibration, an original coupling without the external object is estimated, a total coupling with the external object is estimated; and the reflection coupling is estimated based on the original coupling and the total coupling;

in the second calibration, based on a power gain, a RF front end circuit loss and a low noise amplifier gain, the radar cross section (RCS) power loss and the RF front end gain are calibrated;

after the first calibration and the second calibration, the receiving power difference are averaged;

the distance information between the external object and the electronic device is in negative correlation with an average of the receiving power difference;

the distance information between the external object and the electronic device is determined based on the average of the receiving power difference; and transmission power of the electronic device is refined or adjusted based on the distance information between the external object and the electronic device.

19. The electronic device according to claim 18, wherein in detecting whether the external object is within a detection area, an outmost antenna on a first side of the antenna array is used as a transmission antenna; and a second outmost antenna on the first side of the antenna array is used as a receiving antenna.

20. The electronic device according to claim 19, wherein when the receiving power is higher than a free space threshold value, the external object is determined to be within the detection area of the electronic device; and transmission power of the electronic device is refined or adjusted.

* * * * *